(12) United States Patent
Xu et al.

(10) Patent No.: US 9,374,845 B2
(45) Date of Patent: Jun. 21, 2016

(54) METHOD AND APPARATUS FOR JOINT HARQ AND DRX OPTIMIZATION FOR LOW COST MTC DEVICES

(71) Applicant: QUALCOMM Incorporated, San Diego, CA (US)

(72) Inventors: Hao Xu, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 13/896,250

(22) Filed: May 16, 2013

(65) Prior Publication Data

US 2013/0308465 A1    Nov. 21, 2013

Related U.S. Application Data

(60) Provisional application No. 61/649,198, filed on May 18, 2012.

(51) Int. Cl.
*H04W 76/04* (2009.01)
*H04L 12/807* (2013.01)
*H04W 52/44* (2009.01)

(52) U.S. Cl.
CPC ............. *H04W 76/048* (2013.01); *H04L 47/27* (2013.01); *H04W 52/44* (2013.01)

(58) Field of Classification Search
USPC .......................................... 370/241, 311, 328
See application file for complete search history.

(56) References Cited

U.S. PATENT DOCUMENTS

| 8,249,004 | B2 | 8/2012 | Wang et al. |
| 8,270,932 | B2 | 9/2012 | Kim et al. |
| 2009/0046650 | A1* | 2/2009 | Dalsgaard et al. ............. 370/329 |
| 2009/0232118 | A1* | 9/2009 | Wang et al. .................... 370/338 |

(Continued)

FOREIGN PATENT DOCUMENTS

WO    2008131971 A1    11/2008

OTHER PUBLICATIONS

Ericsson (Aug. 2007). DRx and VoIP, TSG-RAN WG2 meeting #59, R2-073208. Retrieved from http://isearch.3gpp.org/isysquery/13daf4d3-766e-4dc7-8c31-80f8320bbcad/1/doc/.

International Search Report and Written Opinion—PCT/US2013/041731—ISA/EPO—Oct. 4, 2013.

(Continued)

*Primary Examiner* — Pao Sinkantarakorn
*Assistant Examiner* — Stephen Steiner
(74) *Attorney, Agent, or Firm* — Harrity & Harrity, LLP

(57) ABSTRACT

A method for wireless communication may include a mobile entity receiving a timing indicator for a discontinuous reception (DRX) cycle during a DRX mode, and adjusting at least an acknowledgement timing in response to receiving the timing indicator for the DRX cycle. A base station in communication with the mobile entity may provide a timing indicator for a DRX cycle during a DRX mode to the mobile entity, transmit at least one of downlink (DL) data or an uplink (UL) grant indicator to the mobile entity at a first time, and waiting from the first time for a time period indicated by the timing indicator before receiving at least one of an acknowledgement of the DL data or UL data responsive to the UL grant from the mobile entity.

42 Claims, 17 Drawing Sheets

(56) References Cited

U.S. PATENT DOCUMENTS

2009/0239568 A1* 9/2009 Bertrand et al. ............... 455/522
2010/0144299 A1* 6/2010 Ren ............................. 455/226.1
2011/0243047 A1 10/2011 Dayal et al.
2012/0170485 A1 7/2012 Maeda et al.
2012/0300655 A1 11/2012 Lee et al.
2013/0308507 A1* 11/2013 Wanstedt et al. ............. 370/311

OTHER PUBLICATIONS

Nokia: "3GPP TSG-RAN WG2 Meeting #56 R2-063081: Active Mode DRX Details" 3rd Generation Partnership Project (3GPP); Technical Specification Group (TSQ) Radio Access Network (RAN); Working Group 2 (WG2) vol. R2-063081, (Oct. 11, 2006), pp. 1-10, XP002463500.

* cited by examiner

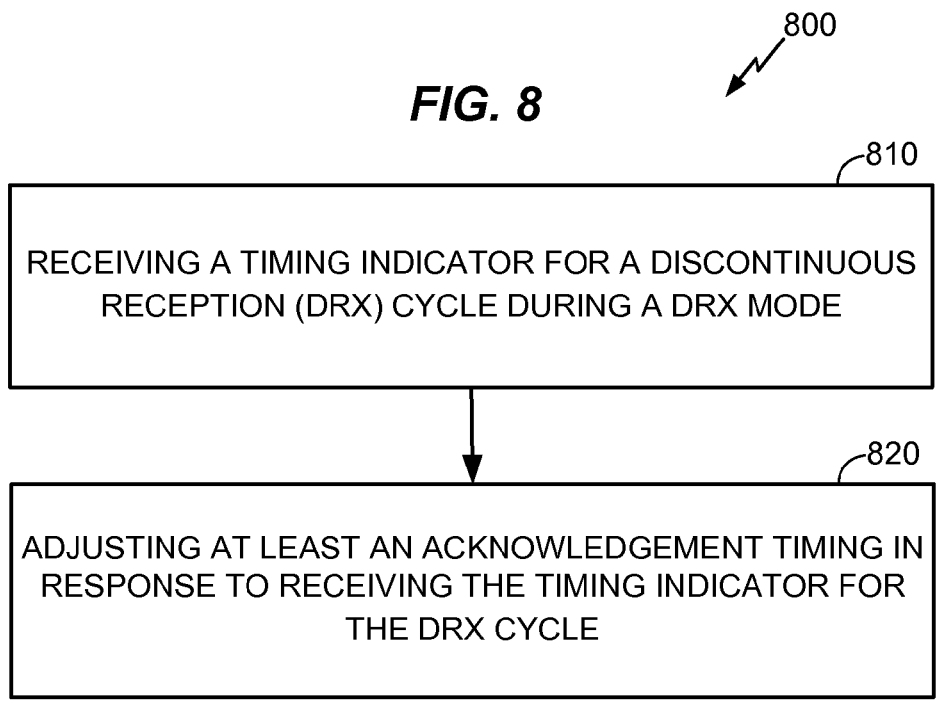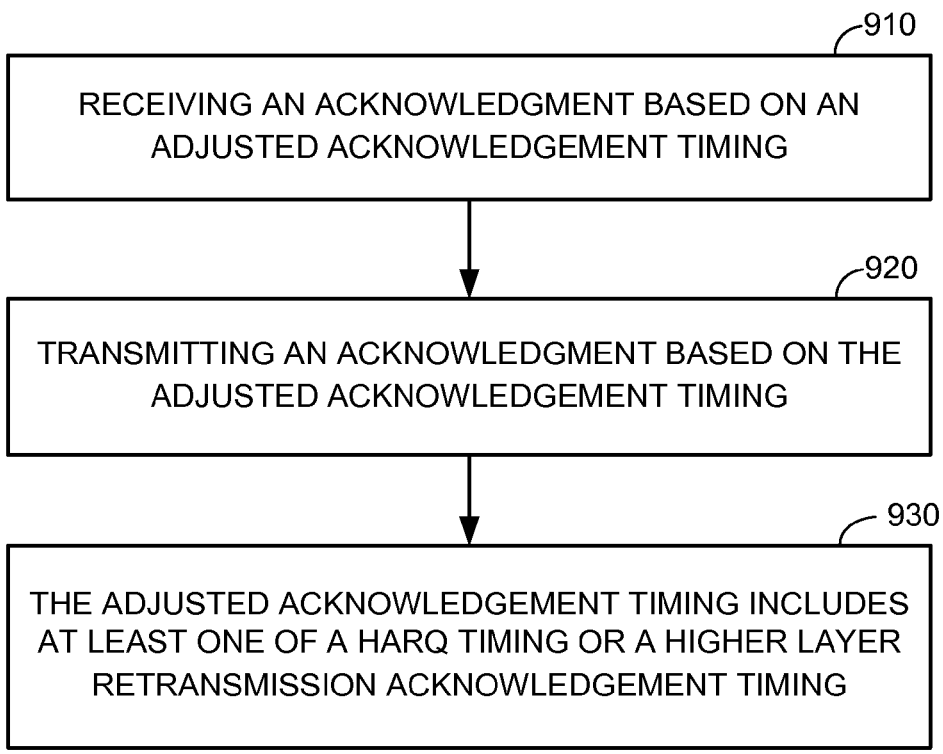

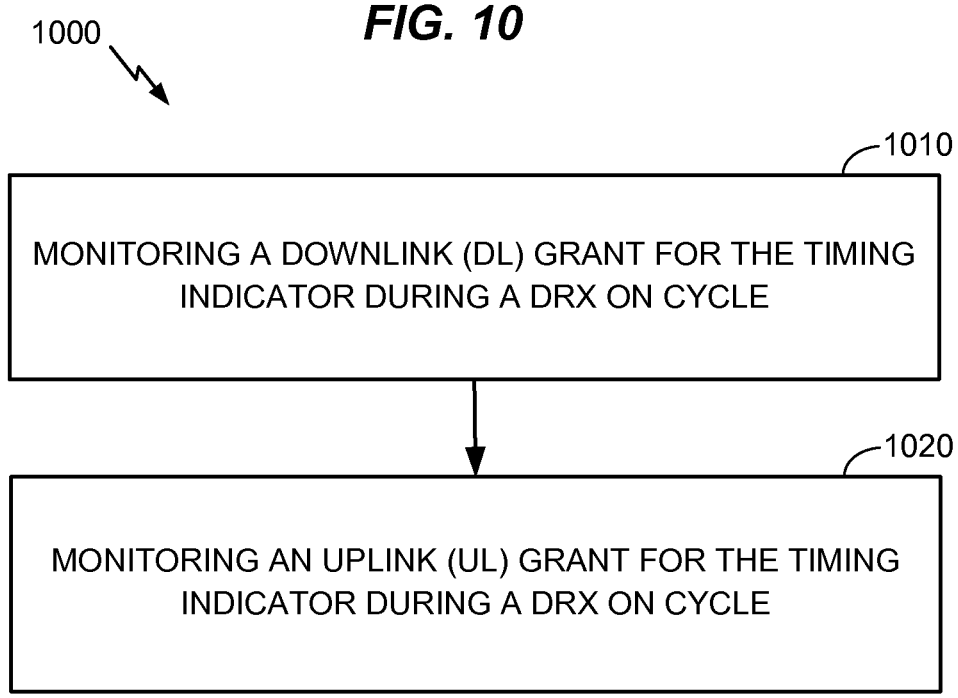
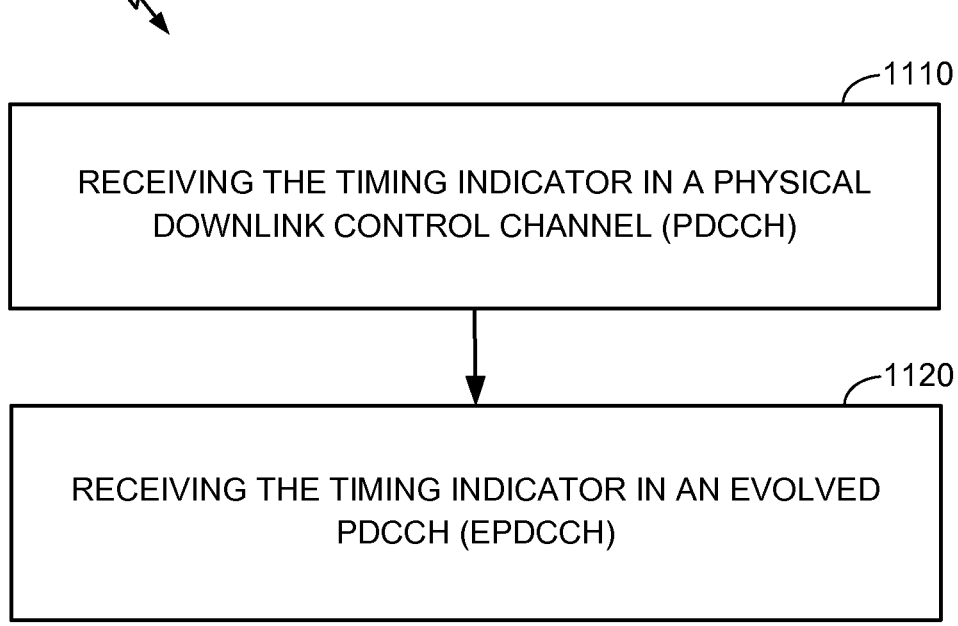

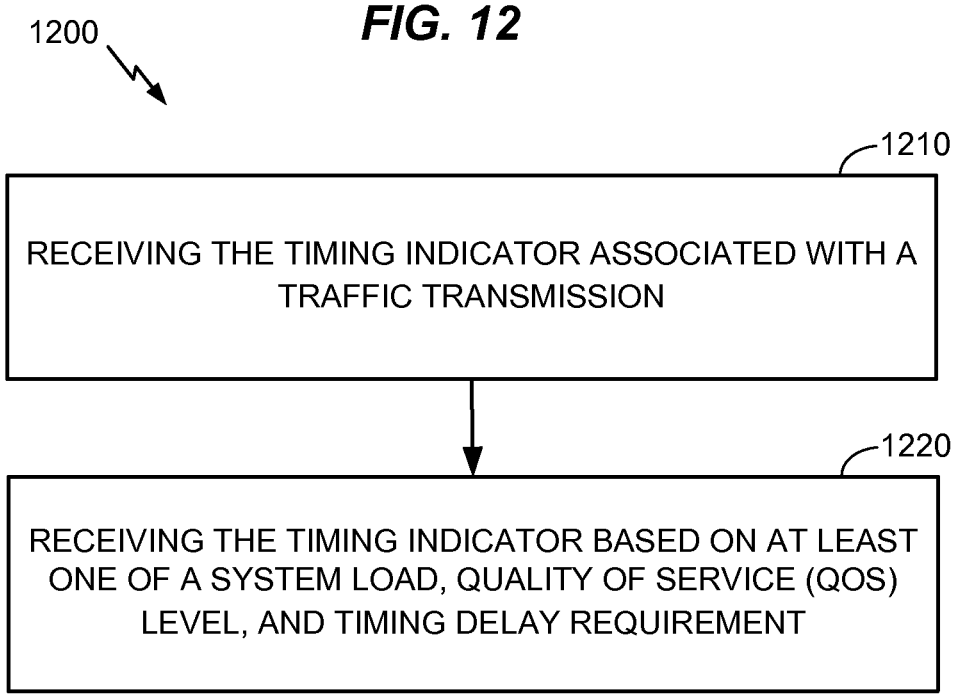
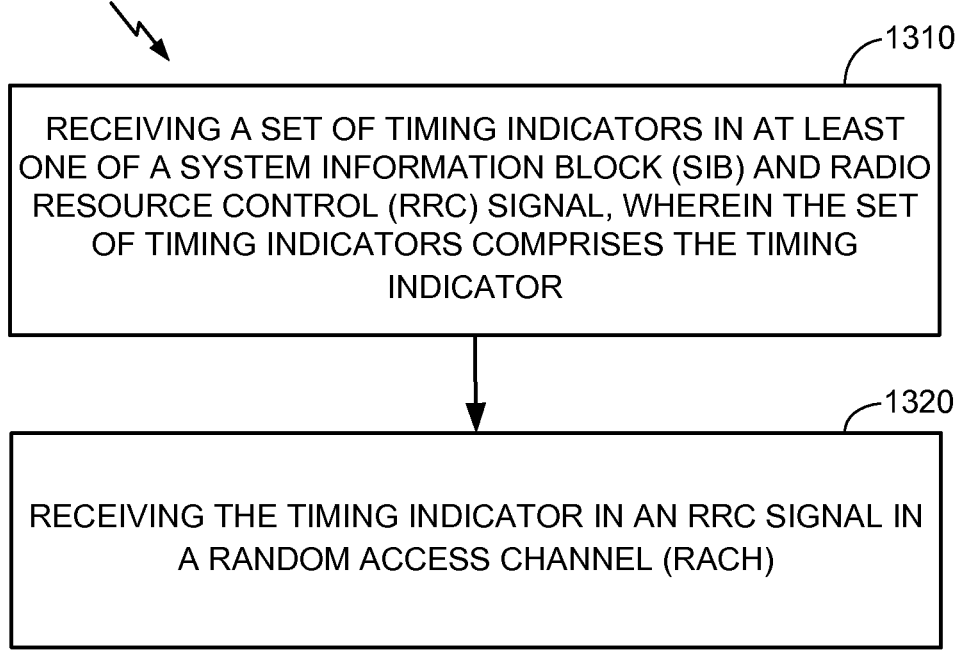

1710
PROVIDING A TIMING INDICATOR FOR A DISCONTINUOUS RECEPTION (DRX) CYCLE DURING A DRX MODE TO A MOBILE ENTITY

1720
TRANSMITTING AT LEAST ONE OF DOWNLINK (DL) DATA OR AN UPLINK (UL) GRANT INDICATOR TO THE MOBILE ENTITY AT A FIRST TIME

1730
WAITING FROM THE FIRST TIME FOR A TIME PERIOD INDICATED BY THE TIMING INDICATOR BEFORE RECEIVING AT LEAST ONE OF AN ACKNOWLEDGEMENT OF THE DL DATA OR UL DATA RESPONSIVE TO THE UL GRANT FROM THE MOBILE ENTITY

┌─ 1910
TRANSMITTING THE TIMING INDICATOR IN A PHYSICAL DOWNLINK CONTROL CHANNEL (PDCCH) OR EVOLVED PDCCH (EPDCCH)

↓ 1920
DETERMINING THE TIMING INDICATOR BASED ON AT LEAST ONE OF A SYSTEM LOAD, QUALITY OF SERVICE (QOS) LEVEL, AND TIMING DELAY REQUIREMENT

↓ 1920
TRANSMITTING A SET OF TIMING INDICATORS IN AT LEAST ONE OF A SYSTEM INFORMATION BLOCK (SIB) AND RADIO RESOURCE CONTROL (RRC) SIGNAL, WHEREIN THE SET OF TIMING INDICATORS COMPRISES THE TIMING INDICATOR

↓ 1920
TRANSMITTING THE TIMING INDICATOR IN AN RRC SIGNAL IN A RANDOM ACCESS CHANNEL (RACH)

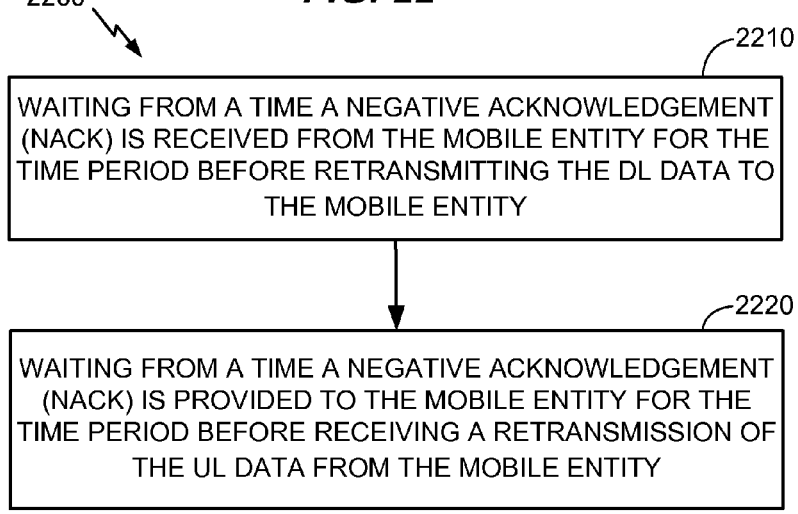
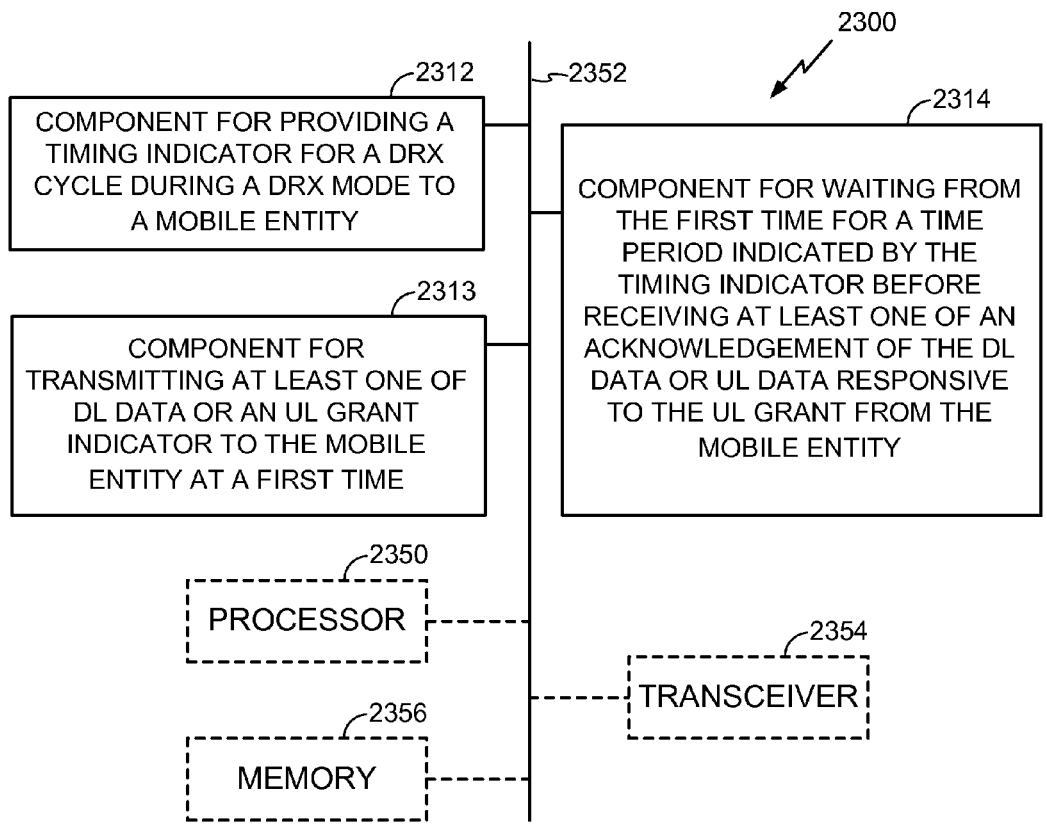

METHOD AND APPARATUS FOR JOINT HARQ AND DRX OPTIMIZATION FOR LOW COST MTC DEVICES

CROSS-REFERENCE TO RELATED APPLICATION

This application claims priority pursuant to 35 U.S.C. §119 (e) to U.S. provisional application Ser. No. 61/649,198, filed May 18, 2012, which is hereby incorporated by reference, in its entirety.

FIELD

Aspects of the present disclosure relate generally to wireless communication systems, and more particularly, to using wireless technology for discontinuous reception (DRX) such as used for machine-type communication (MTC) devices or other terminals.

BACKGROUND

Wireless communication systems are widely deployed to provide various types of communication content such as voice, data, video and the like, and deployments are likely to increase with introduction of new data oriented systems, such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems and other orthogonal frequency division multiple access (OFDMA) systems.

3GPP LTE represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for a number of mobile entities, such as, for example, user equipments (UEs) or access terminals (ATs). A UE may communicate with a base station via the downlink and uplink. The downlink (or forward link) refers to the communication link from the base station to the UE, and the uplink (or reverse link) refers to the communication link from the UE to the base station. Such communication links may be established via a single-in-single-out, multiple-in-signal-out, or a multiple-in-multiple-out (MIMO) system.

Wireless communication systems may use discontinuous reception (DRX) modes to communicate with certain wireless terminals for applications that do not require continuous reception. DRX may provide various advantages, for example power and resource conservation in MTC devices or other terminals. Notwithstanding these advantages, DRX modes as presently implemented may not produce optimal power and resource conservation outcomes. It would be desirable, therefore, to provide improved methods for managing or implementing DRX in a wireless communications system.

SUMMARY

Methods, apparatus and systems for using DRX in wireless communication networks are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method by a mobile entity (e.g., MTC device) or other access terminal for wireless communication receiving a timing indicator for a discontinuous reception (DRX) cycle during a DRX mode. The method may further include the access terminal adjusting at least an acknowledgement timing in response to receiving the timing indicator for the DRX cycle. It should be appreciated that adjusting the acknowledgement timing may include prolonging the period for providing an acknowledgement signal until the next DRX cycle. Therefore, for example, the mobile entity may receive data during a first DRX cycle, and not provide any acknowledgement for receiving the data until the subsequent DRX cycle. In addition, the MTC device or other terminal may power down or go into a low-power mode in between each active DRX cycle. By delaying acknowledgement until a subsequent DRX cycle, the MTC device or other terminal may greatly increase the times during which it is in a power-off or low-power state, and thus, improve power conservation.

In another aspect, the method may include at least one of receiving or transmitting an acknowledgment based on an adjusted acknowledgement timing. In another aspect, the acknowledgement timing may be a hybrid automatic repeat request (HARQ) timing. The network and/or terminal device may determine the timing indicator based on various parameters. In an aspect of the method, the timing indicator is based on at least one of a system load, quality of service (QoS) level, and timing delay requirement.

Similarly, the method may include monitoring one of a downlink (DL) and uplink (UL) grant for the timing indicator during a DRX ON cycle. The terminal may receive the DRX timing indicator from the network in various ways. For example, the method may include the MTC device or other access terminal receiving the timing indicator in a physical downlink control channel (PDCCH) or evolved PDCCH (eP- DCCH). In the alternative, or in addition, the timing indicator may be associated with (e.g., provided in) a traffic transmission. In other embodiments, the method may include receiving a set of timing indicators in at least one of a system information block (SIB) and radio resource control (RRC) signal, wherein the set of timing indicators comprises the timing indicator. For example, the method may include receiving the timing indicator in an RRC signal in a random access channel (RACH).

In other aspects, the method may include transmitting an acknowledgement timing capability to a network node, wherein the received timing indicator is based on the acknowledgement timing capability. In addition, the method may include adjusting at least one of a transmission timing or retransmission timing in response to receiving the timing indicator for the DRX cycle. In related aspects, the method may include switching from a first DRX cycle time to a second DRX cycle time based on the timing indicator, and reverting to the first DRX cycle time after transmission of data.

A network entity, for example a base station, may perform a method or methods complementary to the method or methods for DRX operation by the MTC device or other mobile entity/access terminal. As used herein, "network entity" excludes any access terminal. The method by a network entity may include providing a timing indicator for a DRX cycle during a DRX mode to a mobile entity. In addition, the method may include the network entity transmitting at least one of DL data or an UL grant indicator to the mobile entity at a first time. The method may further include the network entity waiting from the first time for a time period indicated by the timing indicator before receiving at least one of an acknowledgement of the DL data or UL data responsive to the UL grant from the mobile entity.

The method may further include the network entity determining the timing indicator based on a delay sensitivity of the mobile entity. Sensitivity to delay may depend on the application being operated by the mobile entity; certain MTC device applications may have a much lower sensitivity to delay than consumer applications such as voice or video data communications. Hence, the timing indicator for DRX mode may introduce a substantial delay between DRX cycles commensurate with the most delay-sensitive application operating on the mobile entity. The method may include providing the timing indicator configured as a hybrid automatic repeat request (HARQ) timing indicator.

In a related aspect, the method may include waiting for the time period after receiving the UL data before transmitting an acknowledgment for the UL data to the mobile entity. The method may include the network entity determining the timing indicator based on at least one of a system load, quality of service (QoS) level, and timing delay requirement.

In related aspects, the method may further include transmitting the timing indicator in a PDCCH or ePDCCH. The method may further include transmitting a set of timing indicators in at least one of a system information block (SIB) and radio resource control (RRC) signal, wherein the set of timing indicators comprises the timing indicator. For example, the method may include the network entity transmitting the timing indicator in an RRC signal in a random access channel (RACH). The method may include the network entity receiving an acknowledgement timing capability from the mobile entity, and determining the timing indicator at least in part based on the acknowledgement timing capability. In another aspect, the method by the network entity may include switching from a first DRX cycle time to a second DRX cycle time based on the timing indicator, and reverting to the first DRX cycle time after transmission of data.

In related aspects, the method may include the network entity waiting from a time a negative acknowledgement (NACK) is received from the mobile entity for the time period before retransmitting the DL data to the mobile entity. In addition, the method may further include waiting from a time a NACK is provided to the mobile entity for the time period before receiving a retransmission of the UL data from the mobile entity.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such a network entity, for example a base station, eNB, picocell, femtocell or Home Node B, or in the alternative, by an access terminal, for example, a mobile entity, MTC device or UE. Similarly, an article of manufacture may be provided, including a computer-readable storage medium holding encoded instructions, which when executed by a processor, cause a network entity or access terminal to perform the methods and aspects of the methods as summarized above.

BRIEF DESCRIPTION OF THE DRAWINGS

FIG. 8 illustrates an example methodology executable by a mobile entity for joint hybrid automatic repeat request (HARQ) and DRX timing.

FIGS. 9-15 illustrate additional, optional aspects of the methodology shown in FIG. 8.

FIG. 17 illustrates an example methodology executable by a network entity for joint hybrid automatic repeat request (HARQ) and DRX timing.

FIGS. 18-22 illustrate additional, optional aspects of the methodology shown in FIG. 17.

FIG. 23 shows an embodiment of an apparatus, in accordance with the methodology of FIGS. 17-22.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
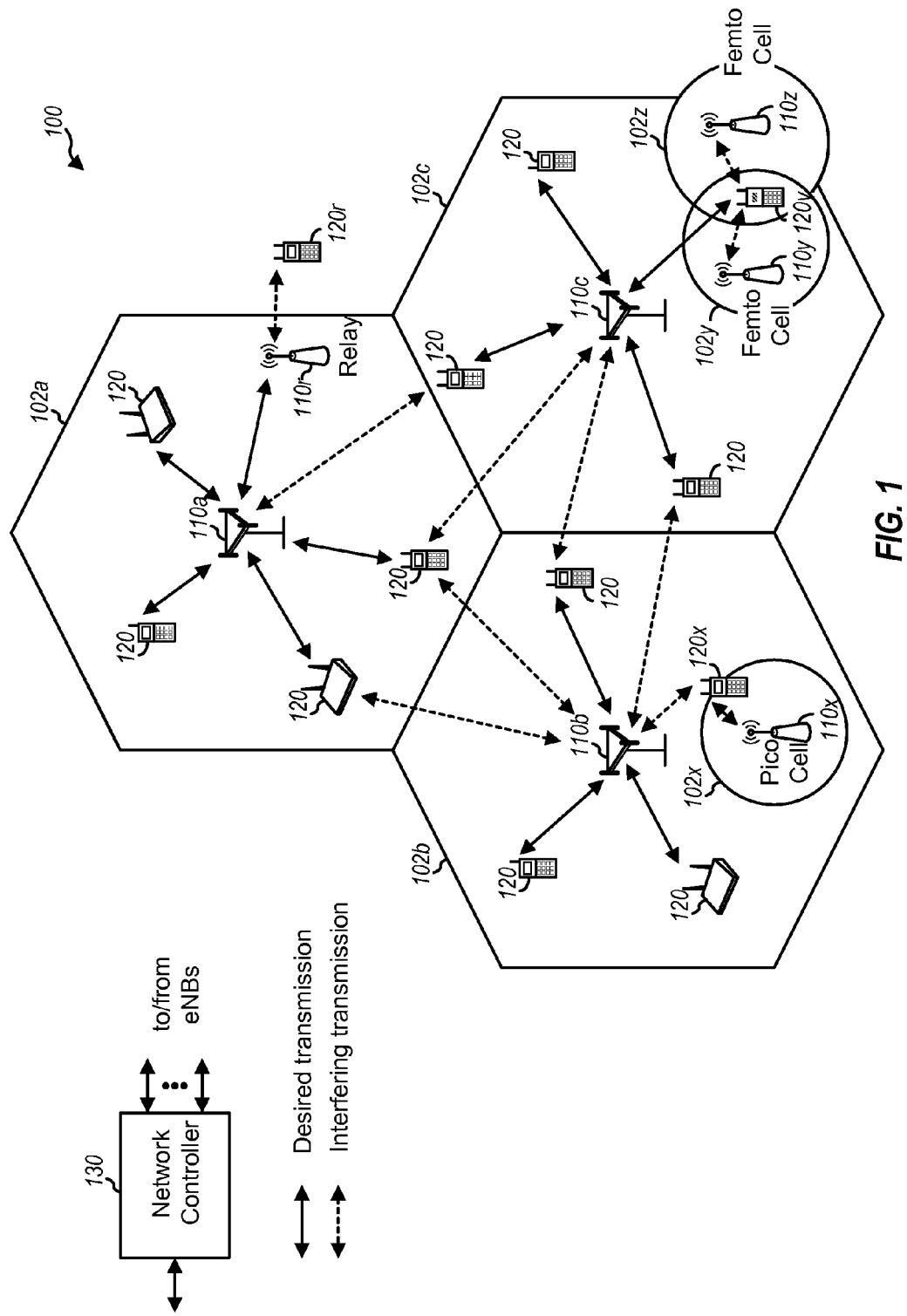
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
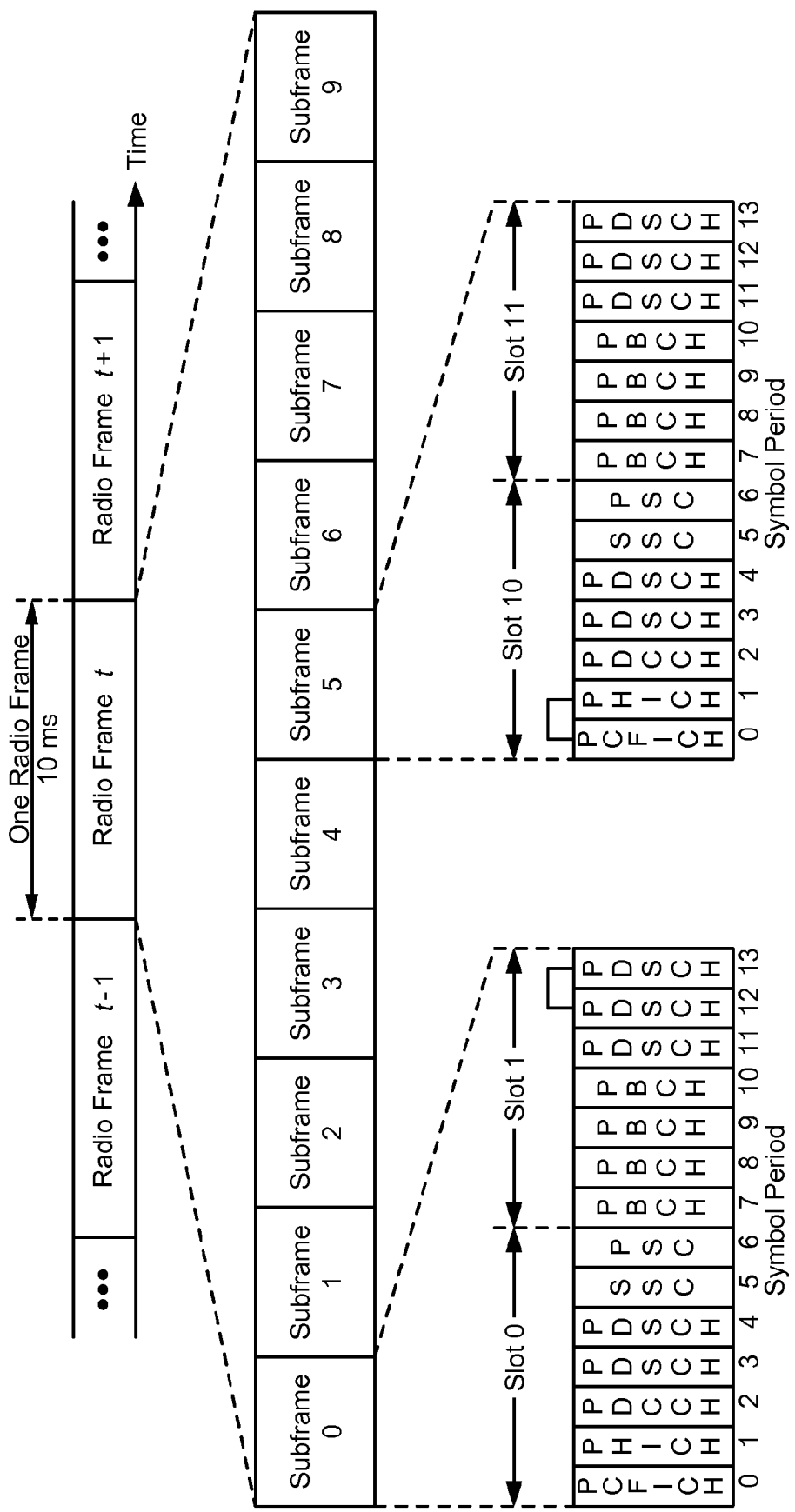
FIG. 2 is a block diagram conceptually illustrating an example of a down link frame structure in a telecommunications system.
Figure 6:
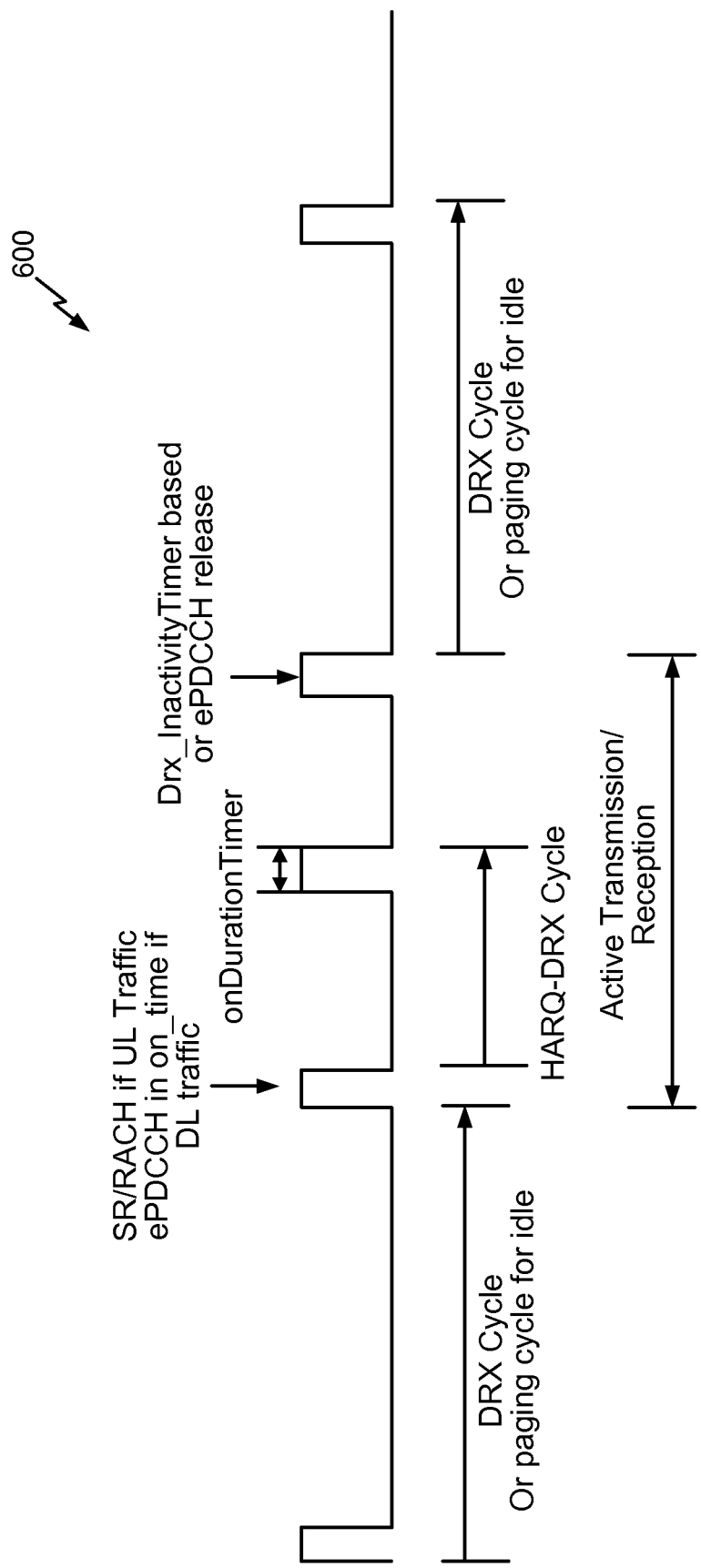
FIG. 6 is a diagram illustrating joint hybrid automatic repeat request (HARQ) and DRX timing.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
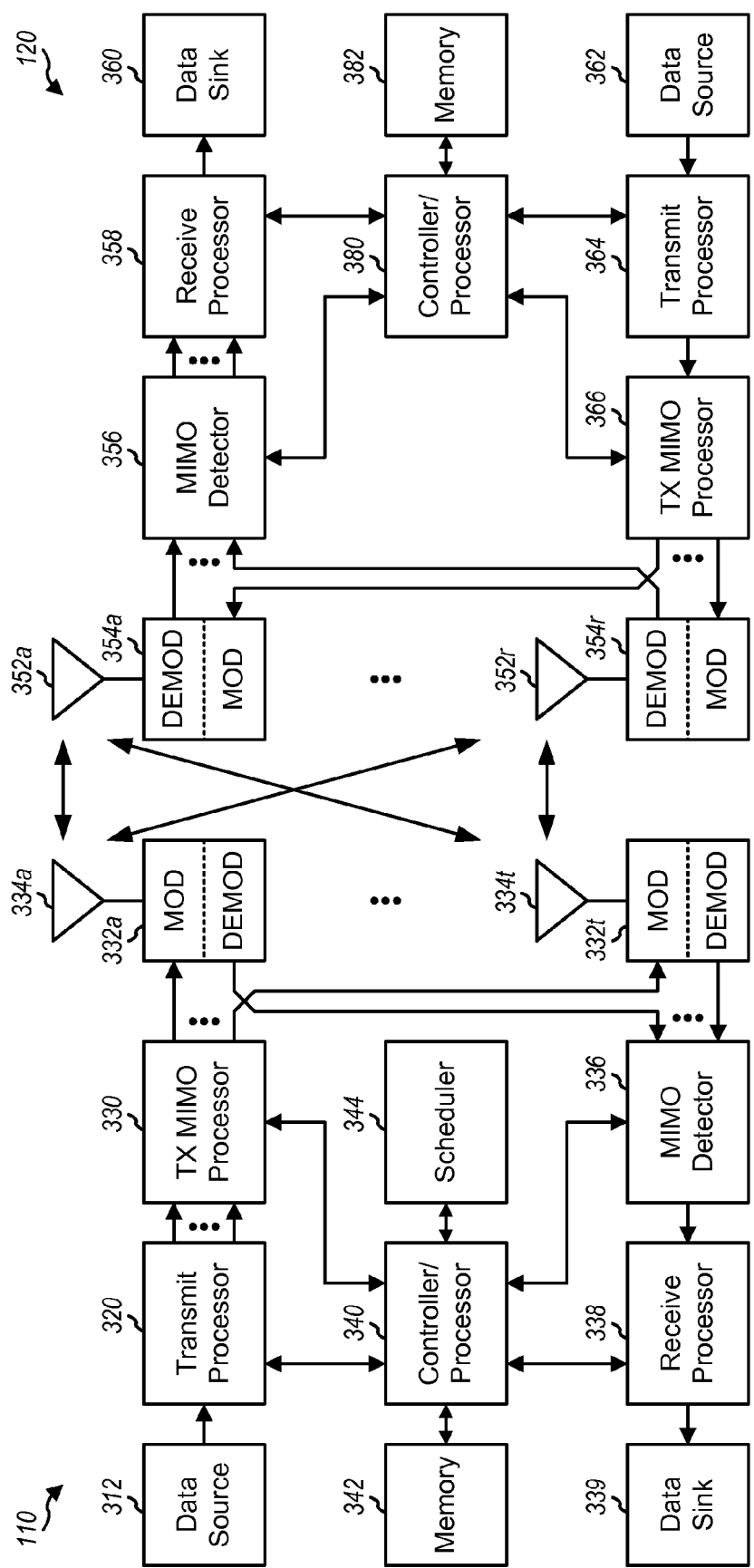
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein, for example as shown in FIGS. 17-22. The processor 380 and/or other processors and modules at the UE 120 may also perform or direct the execution of the functional blocks illustrated in FIGS. 8-15, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

MTC Devices and DRX

LTE designs may provide improvements to spectral efficiency, ubiquitous coverage, enhanced quality of service (QoS), and other advantages. Low-cost low-rate devices may also be supported in LTE designs. Machine type communication (MTC) devices based on LTE may provide the following benefits: reduction of maximum bandwidth; a single receiver RF chain; reduction of peak data rate; reduction of transmit power; and half duplex operation. An MTC device may be referred to as a UE, an MTC UE, a mobile entity, an access terminal, or other terminology. A data rate for low-cost devices, such as the MTC device, may be less than 100 kbps, and operation of the low data rate device may be at a narrow bandwidth to reduce costs of the device. In a first operation scenario, a narrow bandwidth, e.g., 1.25 MHz, may be set aside to support MTC operations. In this scenario, the MTC device may operate in a larger bandwidth to co-exist with standard UEs. In a second scenario, the MTC device may operate at the same larger bandwidth, e.g., up to 20 MHz. Operating at the larger bandwidth, however, may not provide lower cost and reduced power consumption.

Figure 4:
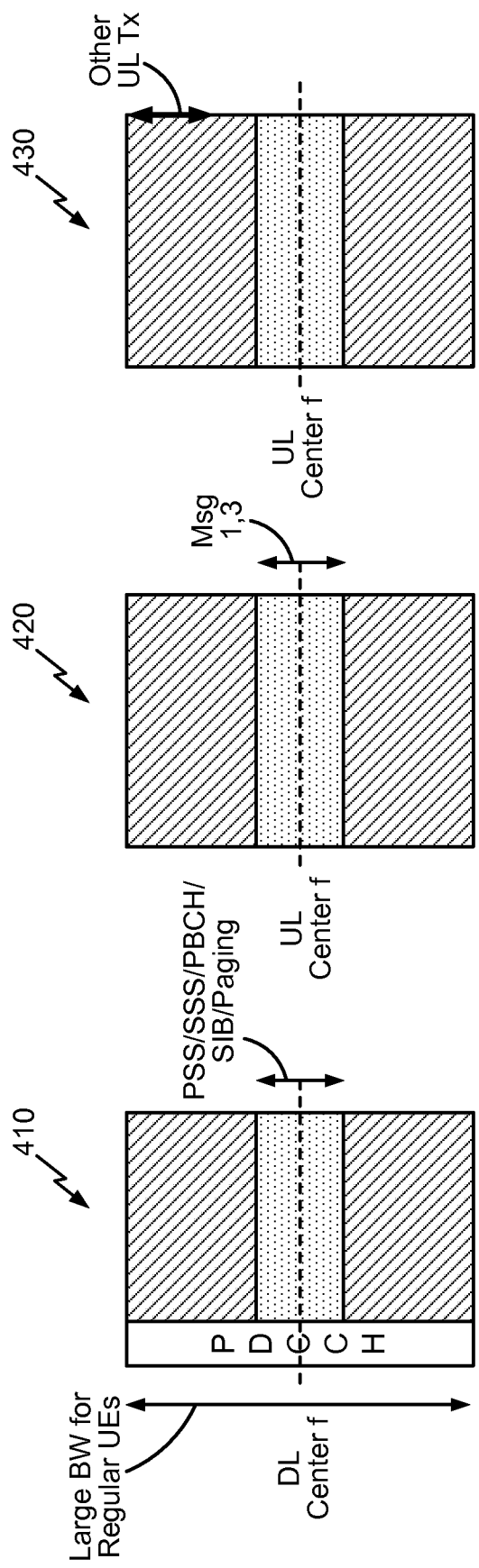
FIG. 4 illustrates operating a narrowband device in a larger bandwidth.

FIG. 4 illustrates operating a narrowband device in a larger bandwidth. Three frequency bandwidths are illustrated in FIG. 4, with one DL bandwidth 410 having center frequency f, and two UL bandwidths 420, 430 with center frequencies f. The DL and UL bandwidths may be 20 MHz bandwidths.

The MTC device may operate both the DL and UL in a narrow bandwidth (e.g., 1.25 MHz) in the larger frequency bandwidth. While the narrow bandwidths in FIG. 4 are shown operating in the center of the larger bandwidth, the narrow bandwidth may or may not be located in the center of the larger bandwidth. The DL bandwidth 410 illustrates a portion of the bandwidth used for the PDCCH. Signaling such as PSS/SSS/PBCH/SIB/Paging may be transmitted in the center of the bandwidth. In the UL bandwidth 420, a RACH procedure (using message 1 and message 3), may be centered in order to facilitate access to the system for the MTC device. Other UL transmissions may be outside of the center of the bandwidth.

Figure 5:
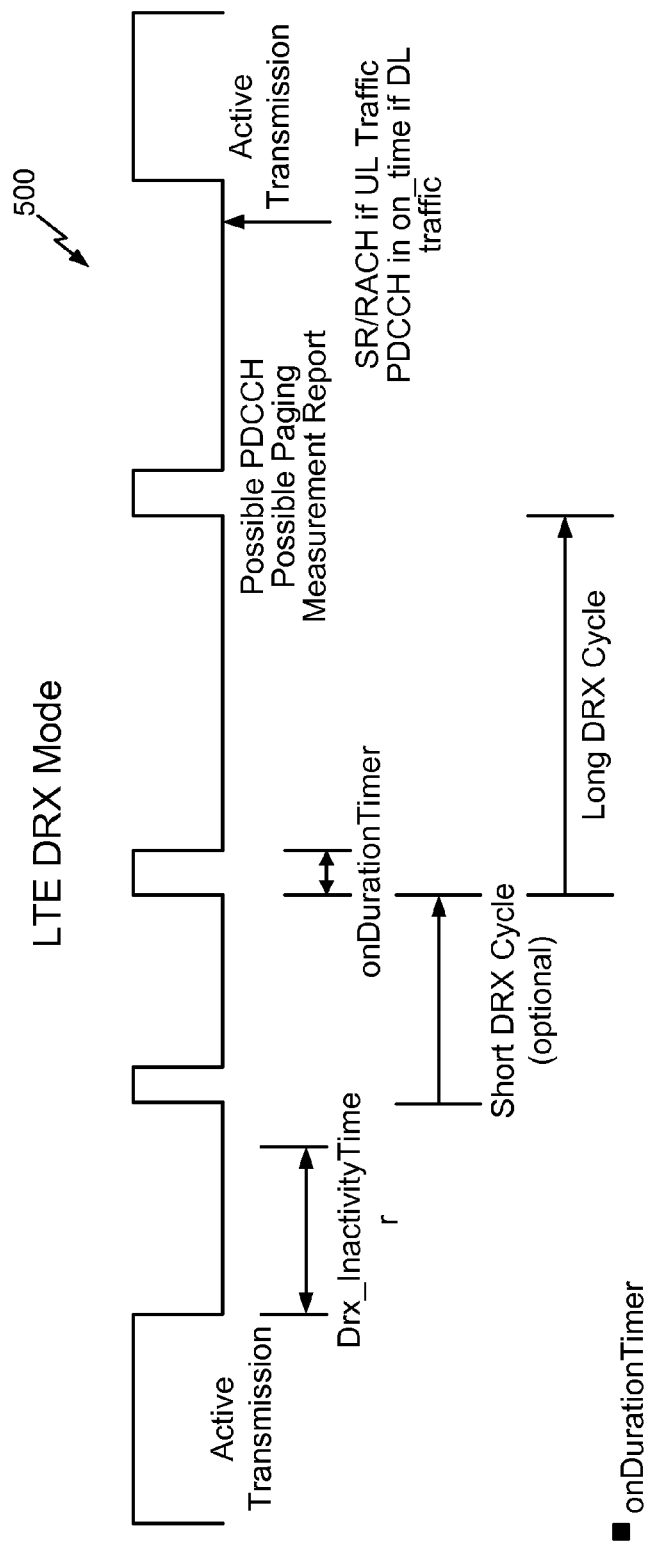
FIG. 5 is a diagram illustrating timing in a discontinuous reception (DRX) operation.

FIG. 5 is a diagram illustrating timing in a discontinuous reception (DRX) operation 500. DRX may allow a device to save battery power by not monitoring control channels continuously, but only at configurable or predetermined intervals. The diagram of FIG. 5 shows a device, such as a UE, starting in active transmission. Whenever there is a packet transmission or reception, a DRX inactivity timer is started or restarted. If the DRX inactivity timer expires, DRX mode is configured, and the UE enters DRX mode. In the example of FIG. 5, the DRX inactivity timer may be configured at the eNB, with the eNB instructing the UE to enter DRX mode. An optional short DRX cycle is shown preceding a long DRX cycle. The UE may monitor the control channels during an ON period or interval of DRX. The UE may receive, for example, a paging message for a paging measurement report in a PDCCH. As soon as traffic data is to be received or transmitted, the UE exits DRX mode. Exiting DRX mode may allow minimum delays for mobile applications.

MTC devices, however, may support lower data rates and be delay tolerant, such that DRX mode for MTC devices may be adjusted for the MTC device characteristics. Further, MTC devices may be battery operated, with battery life being related to the MTC device's delay sensitivity. MTC devices may not require an 8 millisecond turn-around time for HARQ. Relaxed HARQ timing requirements may provide cost savings and energy savings.

Joint Hybrid Automatic Repeat Request (HARQ) and DRX Timing

Figure 7:
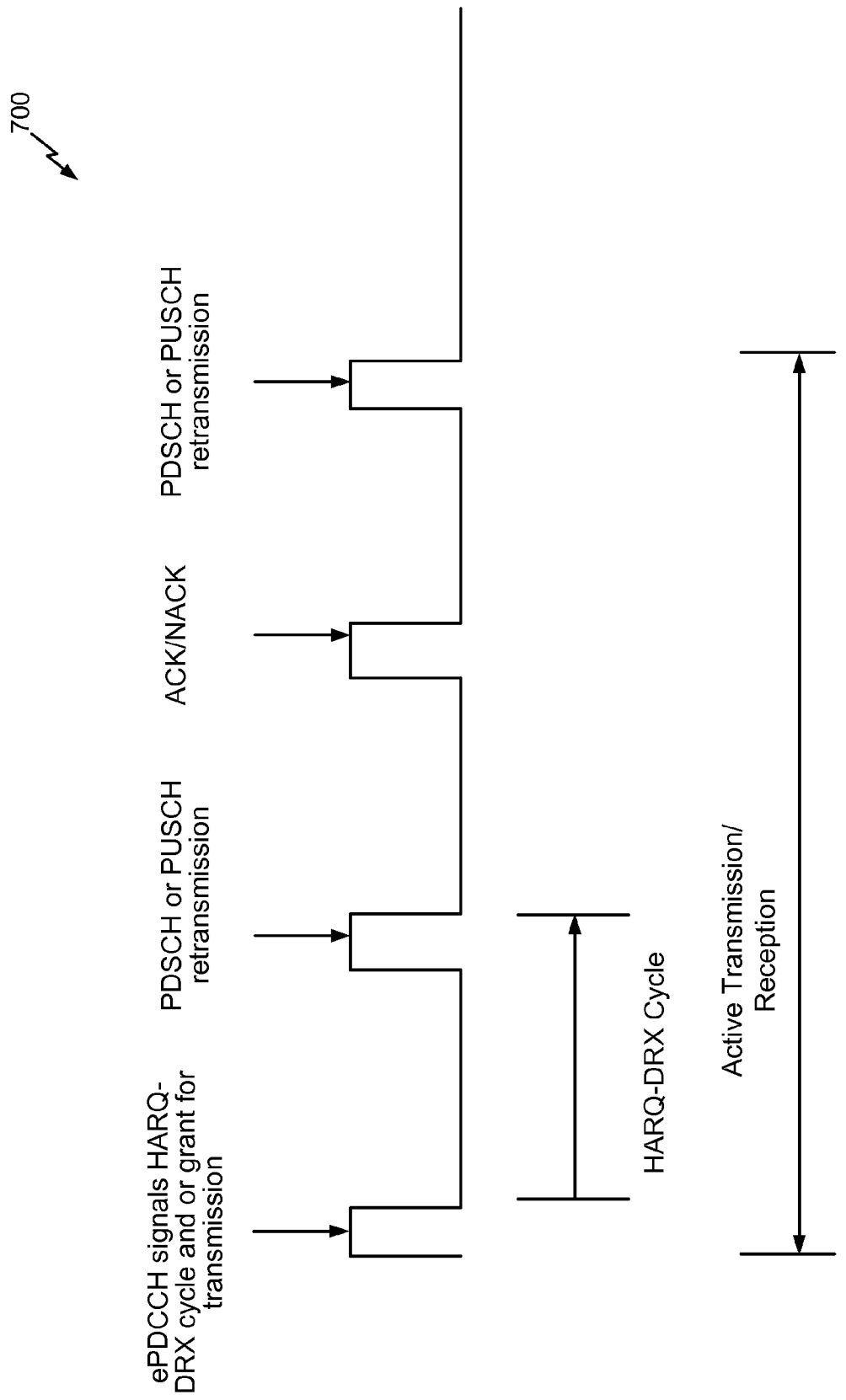
FIG. 7 is a diagram illustrating another embodiment of joint hybrid automatic repeat request (HARQ) and DRX timing.

FIG. 6 is a diagram illustrating a joint hybrid automatic repeat request (HARQ) and DRX timing operation 600. FIG. 7 is a diagram illustrating another embodiment of joint hybrid automatic repeat request (HARQ) and DRX timing. HARQ timing may be based on DRX timing, and DRX timing may be combined with transmission cycles for MTC devices with HARQ timing as illustrated in FIGS. 6 and 7. As shown in FIG. 6, when there is no data traffic for an MTC device, the device will be instructed to enter a long DRX cycle or go into idle mode. The DRX cycle or paging cycle, in the case of idle mode, may be on the order of hundreds of milliseconds (ms) or seconds; or the cycles may be extended to greater time durations.

As shown in FIG. 7, when there are traffic data, a new timing may be signaled to the MTC device to follow the DRX timing and HARQ timing. The HARQ timing and DRX timing may be a combined timing, hereinafter referred to as HARQ_DRX timing, such that the combined timing is used for both HARQ turn-around timing and DRX timing. As shown in FIG. 7, the ACK timing may follow the same timing as DRX cycle. FIG. 7 shows an example wherein only ACK/NACK is transmitted during the third ON time, but in general, data may also be transmitted during HARQ-DRX on cycles.

Because the device may wake up to either monitor downlink or transmit on the uplink regularly, the combined timing of DRX and HARQ should reduce the total awake time and provide energy saving.

The MTC device may monitor DL/UL grants only at the HARQ_DRX cycle ON time intervals. The MTC device's HARQ process may also follow the HARQ_DRX cycle time. Alternatively, the HARQ and DRX timing may be signed as separate timing indicators. In addition, each MTC device may receive an individual HARQ_DRX cycle time depending on system load, quality of service (QoS) level, and delay requirements. HARQ turn-around timing may be much more relaxed than 8 milliseconds or a 4 millisecond ACK/NACK. The HARQ_DRX cycle time may be an adaptive time based on QoS level, system loading, battery requirements, etc. The benefits of the combined HARQ_DRX cycle timing and processing may include cost savings and power saving, the MTC device only needing to wake up for both monitoring and data transmissions.

The adaptive timing provides flexible QoS and load balancing. To multiplex different MTC devices with different QoS, an eNB may provide different periodicity for HARQ_DRX timing to control transmission cycles. For delay-sensitive applications, a low duty cycle may be provided on the order of 8 ms. For delay non-sensitive applications, a large duty cycle may be provided on the order of tens of ms or more. The different periodicities may simplify the HARQ process for the MTC device and also allow the eNB to more easily control multiplexing different MTC devices. Different periodicities may also be applied to other UEs with relaxed latency and low data rate requirements. A set of subframes may be defined for use in monitoring the ePDCCH/ePHICH, with the set of subframes used to determine HARQ timing.

The HARQ_DRX cycle time may be signaled to the UE as follows. The eNB defines a set of allowed HARQ_DRX cycle times in the SIB or RRC transmitted to the UE. One default DRX cycle time may be used by the UE to monitor assignment/paging, for example in the PDCCH or ePDCCH. The HARQ_DRX cycle time may be dynamically signaled on a first transmission on the PDCCH or ePDCCH (FIG. 7), with all subsequent transmissions after the first transmission following the HARQ_DRX cycle time. In FIG. 7, the first ePDCCH transmission includes the HARQ_DRX cycle time and also may include a grant for transmission. The cycle times in FIG. 7 including the PDSCH or PUSCH transmission, ACK/NACK, and PDSCH or PUSCH retransmission may then follow the same HARQ_DRX cycle time received in the first ePDCCH transmission. This procedure may be similar to DRX activation, with the new HARQ cycle time included. When there are no traffic data transmissions, the MTC device will enter DRX mode with a very long cycle time or enter idle mode, as illustrated at the end of the diagram in FIG. 6. When there is DL data traffic, the first grant or paging message sent to the MTC device will include the HARQ_DRX cycle time. When there is a UL traffic data transmission, the traffic data may be transmitted on the RACH or transmitted during an ON interval of the DRX cycle.

If the MTC device supports only a relaxed HARQ turn-around time (e.g., larger than 4 ms for ACK/NACK and larger than 8 ms for retransmission) the RACH procedure may need to be modified to allow for the delayed response time. The modified procedure may include the MTC device checking into the system with a RACH procedure to monitor only predefined subframes. In a first option, the RACH procedure may be redefined for the UE to monitor only fixed time instances. In an alternative option, a window may be defined for RACH messages. The UE may receive the RRC signal with the desired transmission cycle time. After receiving the RRC signal, the UE starts to follow the timing for transmission and reception. The MTC device may receive a special RACH sequence or configuration so that when the MTC transmits on the RACH, the eNB follows a different timing.

The UE may further assist the network in HARQ timing selection. The UE may signal a set of timing to the eNB, so that the eNB may determine the transmission cycle time based on the set of timing transmitted from the UE. The UE-assisted HARQ timing selection may include the UE initially checking into the system in an always-on mode to monitor every subframe. The UE may transmit its set of timing to the eNB in a RACH procedure or during RRC connection setup. The set of timing may be based on desired transmission cycles, delay requirements, or HARQ turn-around timing capabilities. After determining the transmission cycle time, the eNB may transmit the selected time to the UE through either RRC or dynamically.

For MTC devices, ACK-less operations may also be possible, where all UL transmissions and DL transmissions are based on the PDCCH/ePDCCH order. In this case, the MTC device follows the HARQ_DRX timing line for retransmissions without ACK/NACK. The retransmission can be also based on higher layer retransmission without physical layer HARQ. It may be possible to limit the range for the HARQ_DRX timing to certain ranges, e.g., within tens of ms, for simple eNB operations. The ON intervals may include one or more subframes. Full duplex MTC may include only one subframe. Half duplex MTC may include more than one subframe for ON intervals so that both UL and DL transmissions may be supported. In addition, if the MTC device is fixed and the eNB has determined the MTC device's unique ID, then the timing for DRX or HARQ_DRX may be preconfigured.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

In accordance with one or more aspects of the embodiments described herein, with reference to FIG. 8, there is shown a methodology 800, operable by a wireless device (e.g., mobile entity, a UE, an MTC device, or the like) for joint HARQ and DRX timing. Specifically, the method 800 may involve, at 810, receiving a timing indicator for a discontinuous reception (DRX) cycle during a DRX mode. The method 800 may involve, at 820, adjusting at least an acknowledgement timing in response to receiving the timing indicator for the DRX cycle. Adjusting the acknowledgement timing may include prolonging the period for providing an acknowledgement signal from the mobile entity until the next DRX cycle. Therefore, for example, the mobile entity may receive data during a first DRX cycle, and not provide any acknowledgement for receiving the data until the subsequent DRX cycle. This may substantially reduce power used for wireless communications during the DRX off cycle and improve power conservation.

FIGS. 9-15 show further optional operations or aspects 900-1500 that may be performed by the base station in conjunction with the method 800 for DRX operation by a mobile entity of a wireless communications system. The operations shown in FIGS. 9-15 are not required to perform the method 800. Operations 900-1500 are independently performed and generally not mutually exclusive unless positioned on opposing branches from a block. Any one of such independent and not mutually exclusive operations may be performed regardless of whether another downstream or upstream operation is performed. If the method 800 includes at least one operation of FIGS. 900-1500, then the method 800 may terminate after the at least one operation, without necessarily having to include any subsequent downstream operation(s) that may be illustrated. Conversely, operations that are positioned directly on opposing branches of a block may be mutually exclusive alternatives in any particular instance of the method.

Referring to FIG. 9, the method 800 may include one or more of the additional operations 900. For example, the method 800 may further include, at 910, receiving an acknowledgment based on an adjusted acknowledgement timing. Conversely, the method 800 may include, at 920, transmitting an acknowledgment based on an adjusted acknowledgement timing. In blocks 910 and 920, "based on" includes performing the recited actions only at the times specified by the timing indicator, for example including waiting and not performing the action during the DRX off cycle specified by the timing indicator. In another aspect, at 930, the acknowledgement timing may be, or may include, a hybrid automatic repeat request (HARQ) timing. In an alternative, the acknowledgement timing may be, or may include, a higher layer retransmission acknowledgement timing that may exclude HARQ timing.

Referring to FIG. 10, the method 800 may include one or more of the additional operations 1000. For example, the method 800 may further include, at 1010, monitoring a DL grant for the timing indicator during a DRX ON cycle. In addition, the method may include, at 1020, monitoring an UL grant for the timing indicator during a DRX ON cycle.

Referring to FIG. 11, the method 800 may include one or more of the additional operations 1100. For example, the method 800 may further include, at 1110, the MTC device or other access terminal receiving the timing indicator in a physical downlink control channel (PDCCH). In an alternative, or in addition, the method 800 may further include, at 1120, receiving the timing indicator in an evolved PDCCH (ePDCCH).

In the alternative, or in addition, the method 800 may include one or more of the additional operations 1200 shown in FIG. 12. For example, the method 800 may further include, at 1210, receiving the timing indicator associated with (e.g., provided in) a traffic transmission from the base station. In an aspect of the method 800, at 1220, the timing indicator is based on at least one of a system load, quality of service (QoS) level, and timing delay requirement.

Referring to FIG. 13, the method 800 may include one or more of the additional operations 1300. For example, the method 800 may further include, at 1310, receiving a set of timing indicators in at least one of a SIB and RRC signal, wherein the set of timing indicators comprises the timing indicator. For example, the method 800 may further include, at 1320, receiving the timing indicator in an RRC signal in a RACH.

Figure 14:
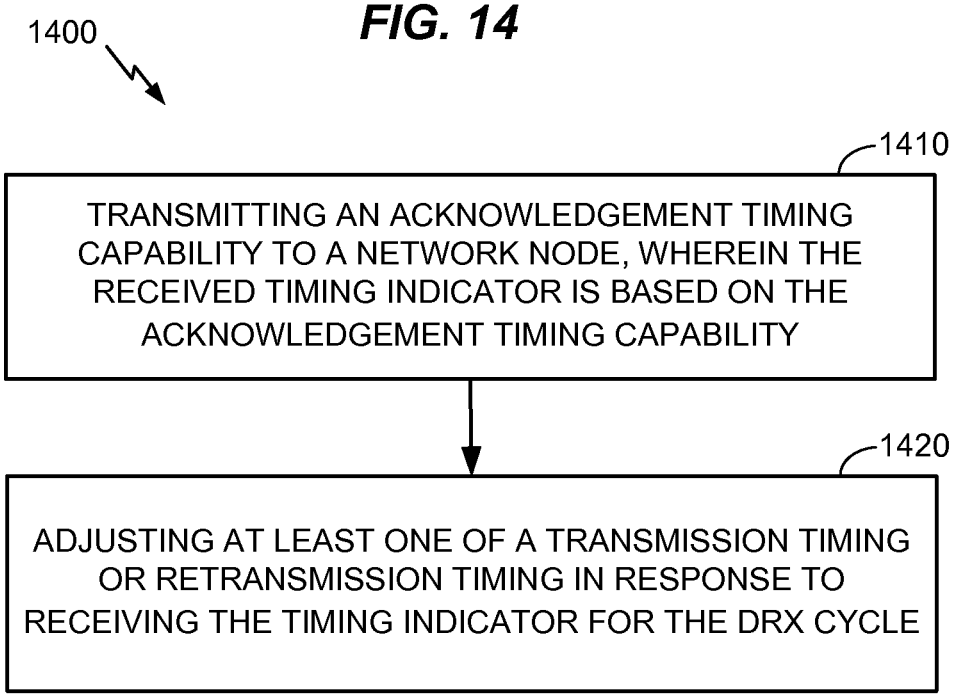

Referring to FIG. 14, the method 800 may include one or more of the additional operations 1400. For example, the method 800 may further include, at 1410, transmitting an acknowledgement timing capability to a network node, wherein the received timing indicator is based on the acknowledgement timing capability. The method 800 may further include, at 1420, adjusting at least one of a transmission timing or retransmission timing in response to receiving the timing indicator for the DRX cycle. In related aspects, the method may include switching from a first DRX cycle time to a second DRX cycle time based on the timing indicator, and reverting to the first DRX cycle time after transmission of data.

Figure 15:
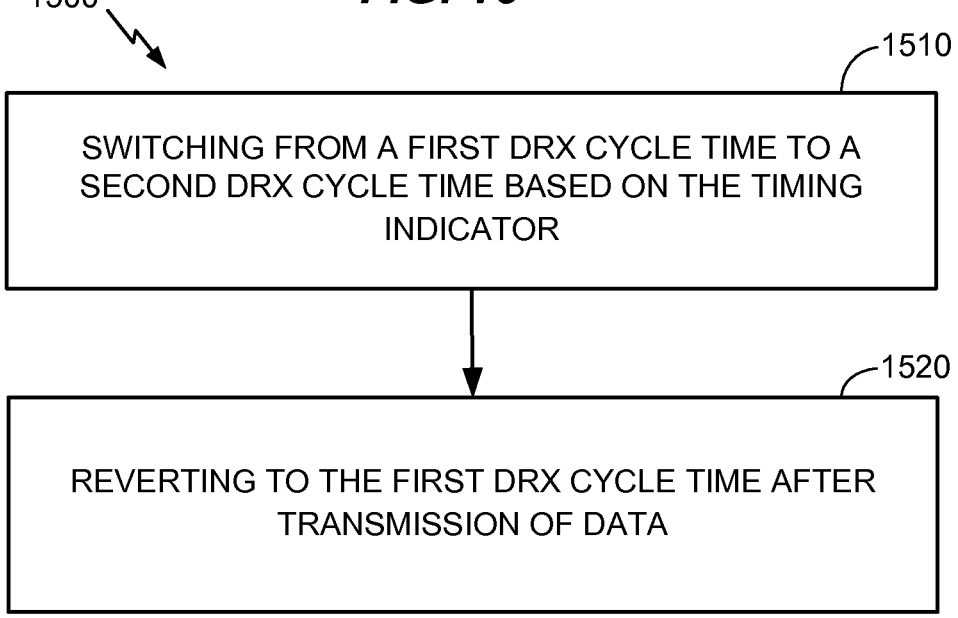

Referring to FIG. 15, the method 800 may include one or more of the additional operations 1500. For example, the method 800 may further include, at 1510, switching from a first DRX cycle time to a second DRX cycle time based on the timing indicator. The method 800 may further include, at 1520, reverting to the first DRX cycle time after transmission of data.

Figure 16:
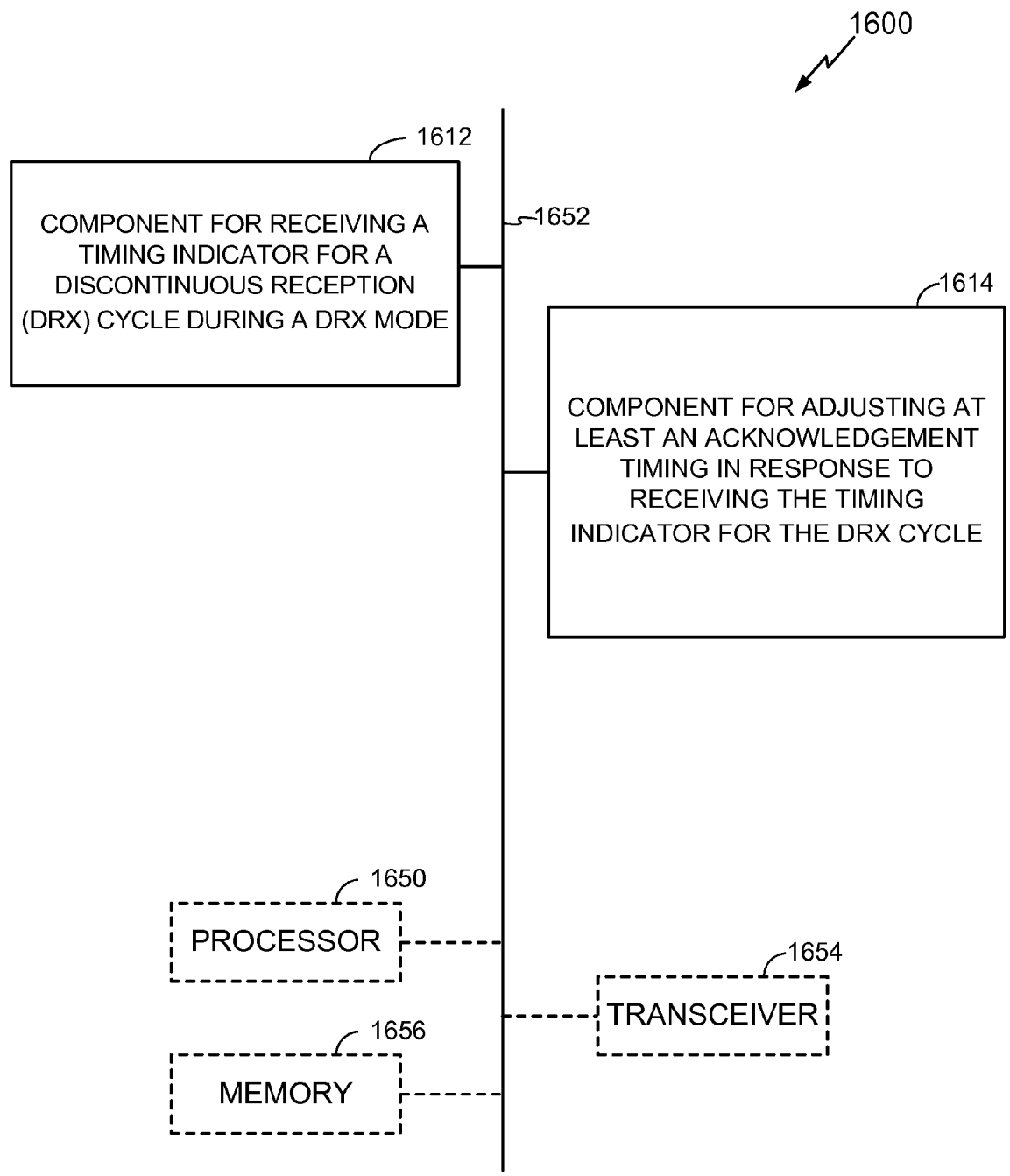
FIG. 16 shows an embodiment of an apparatus in accordance with the methodology of FIGS. 8-15.

In accordance with one or more aspects of the embodiments described herein, there are provided devices and apparatuses for joint HARQ and DRX timing, as described above with reference to FIGS. 8-15. With reference to FIG. 16, there is provided an exemplary apparatus 1600 that may be configured as a wireless device, or as a processor or similar device/component for use within. The apparatus 1600 may include functional blocks that can represent functions implemented by a processor, software, or combination thereof (e.g., firmware). For example, apparatus 1600 may include an electrical component, module or means 1612 for receiving a timing indicator for a discontinuous reception (DRX) cycle during a DRX mode. Said means may include a processor executing a more detailed algorithm, for example as described in connection with FIGS. 8-15. The apparatus 1600 may include a component, module or means 1614 for adjusting at least of one an acknowledgement timing, transmission timing, and/or retransmission timing in response to receiving the timing indictor for the DRX cycle. Said means may include a processor executing a more detailed algorithm, for example as described in connection with FIGS. 8-15.

In related aspects, the apparatus 1600 may optionally include a processor component 1650 having at least one processor, in the case of the apparatus 1600 configured as a wireless device (e.g., mobile entity, a UE, an MTC device, or the like), rather than as a processor. The processor 1650, in such case, may be in operative communication with the components 1612-1614 via a bus 1652 or similar communication coupling. The processor 1650 may effect initiation and scheduling of the processes or functions performed by electrical components 1612-1614.

In further related aspects, the apparatus 1600 may include a transceiver component 1654 (radio/wireless or wired). A stand alone receiver and/or stand alone transmitter may be used in lieu of or in conjunction with the transceiver 1654. The apparatus 1600 may optionally include a component for storing information, such as, for example, a memory device/component 1656. The computer readable medium or the memory component 1656 may be operatively coupled to the other components of the apparatus 1600 via the bus 1652 or the like. The memory component 1656 may be adapted to store computer readable instructions and data for effecting the processes and behavior of the components 1612-1614, and subcomponents thereof, or the processor 1650, or the methods disclosed herein. The memory component 1656 may retain instructions for executing functions associated with the components 1612-1614. While shown as being external to the memory 1656, it is to be understood that the components 1612-1614 can exist within the memory 1656. It is further noted that the components in FIG. 16 may comprise processors, electronic devices, hardware devices, electronic subcomponents, logical circuits, memories, software codes, firmware codes, etc., or any combination thereof.

In accordance with one or more aspects of the embodiments described herein, with reference to FIG. 17, there is shown a methodology 1700, operable by a network entity (e.g., a BS, an eNB, or the like) for joint HARQ and DRX timing. Specifically, the method 1700 may involve, at 1710, providing a timing indicator for a DRX cycle during a DRX mode to a mobile entity. In addition, the method 1700 may include, at 1720, the network entity transmitting at least one of DL data or an UL grant indicator to the mobile entity at a first time. The method 1700 may further include, at 1730, waiting from the first time for a time period indicated by the timing indicator before receiving at least one of an acknowledgement of the DL data or UL data responsive to the UL grant from the mobile entity.

FIGS. 18-22 show further optional operations or aspects 1800-2200 that may be performed by the base station in conjunction with the method 1700 for DRX operation at a network entity of a wireless communications system. The operations shown in FIGS. 18-22 are not required to perform the method 1700. Operations 1800-2200 are independently performed and generally not mutually exclusive unless positioned on opposing branches from a block. Any one of such independent and not mutually exclusive operations may be performed regardless of whether another downstream or upstream operation is performed. If the method 1700 includes at least one operation of FIGS. 18-22, then the method 1700 may terminate after the at least one operation, without necessarily having to include any subsequent downstream operation(s) that may be illustrated. Conversely, operations that are positioned directly on opposing branches of a block may be mutually exclusive alternatives in any particular instance of the method.

Figure 18:
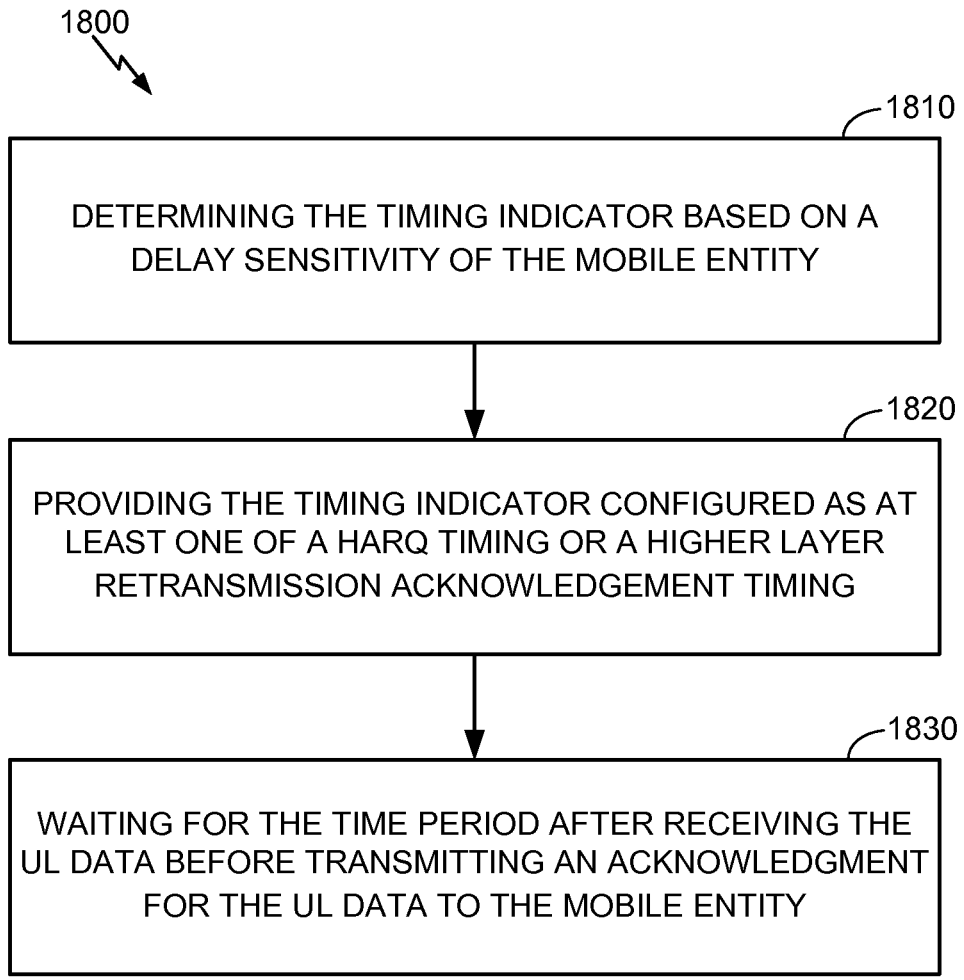

Referring to FIG. 18, the method 1700 may include one or more of the additional operations 1800. For example, the method 1700 may further include, at 1810, determining the timing indicator based on a delay sensitivity of the mobile entity. Sensitivity to delay may depend on the application being operated by the mobile entity; certain MTC device applications may have a much lower sensitivity to delay than consumer applications such as voice or video data communications. Hence, the timing indicator for DRX mode may introduce a substantial delay between DRX cycles commensurate with the most delay-sensitive application operating on the mobile entity. The method 1700 may further include, at 1820, providing the timing indicator configured as a hybrid automatic repeat request (HARQ) timing indicator, or in an alternative, as a higher layer retransmission acknowledgement timing indicator that may exclude a HARQ timing indicator.

In a related aspect, the method 1700 may include, at 1830, waiting for the time period after receiving the UL data before transmitting an acknowledgment for the UL data to the mobile entity. Accordingly, the mobile entity need not be ready to receive the acknowledgment until the next DRX on cycle.

Referring to FIG. 19, the method 1700 may include one or more of the additional operations 1900. For example, the method 1700 may further include, at 1910, transmitting the timing indicator in a PDCCH or ePDCCH. The method 1700 may further include, at 1920, determining the timing indicator based on at least one of a system load, quality of service (QoS) level, and timing delay requirement. The method may 1700 further include, at 1920, transmitting a set of timing indicators in at least one of a system information block (SIB) and radio resource control (RRC) signal, wherein the set of timing indicators comprises the timing indicator. For example, the method 1700 may include, at 1920, the network entity transmitting the timing indicator in an RRC signal in a random access channel (RACH).

Figure 20:
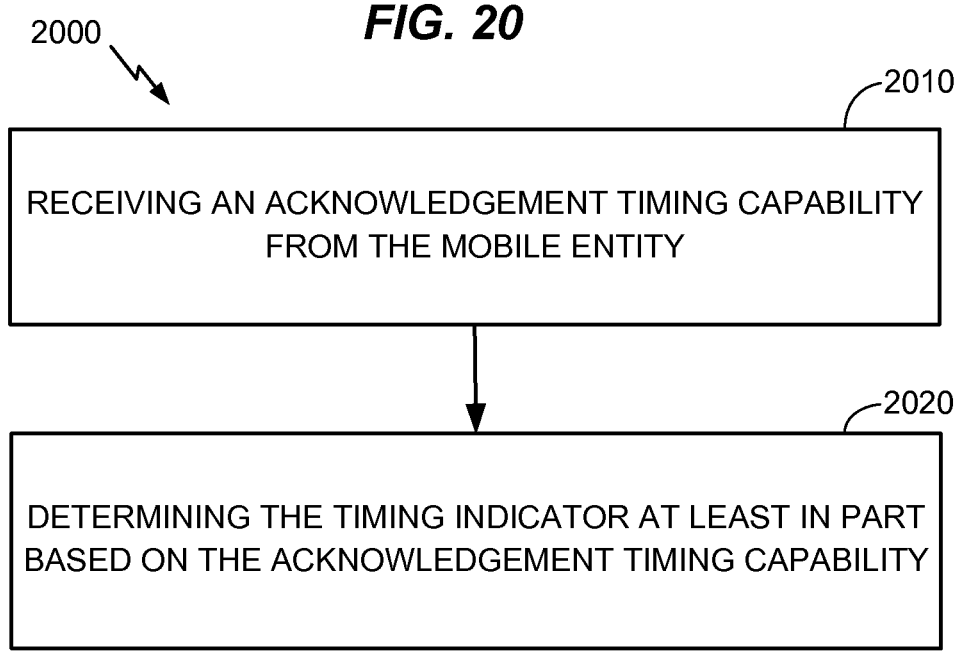

Referring to FIG. 20, the method 1700 may include one or more of the additional operations 2000. For example, the method 1700 may further include, at 2010, receiving an acknowledgement timing capability from the mobile entity. For example, the acknowledgment timing capability may indicate a range of DRX timing that can be implemented by the mobile entity. The method 1700 may further include, at 2020 determining the timing indicator at least in part based on the acknowledgement timing capability.

Figure 21:
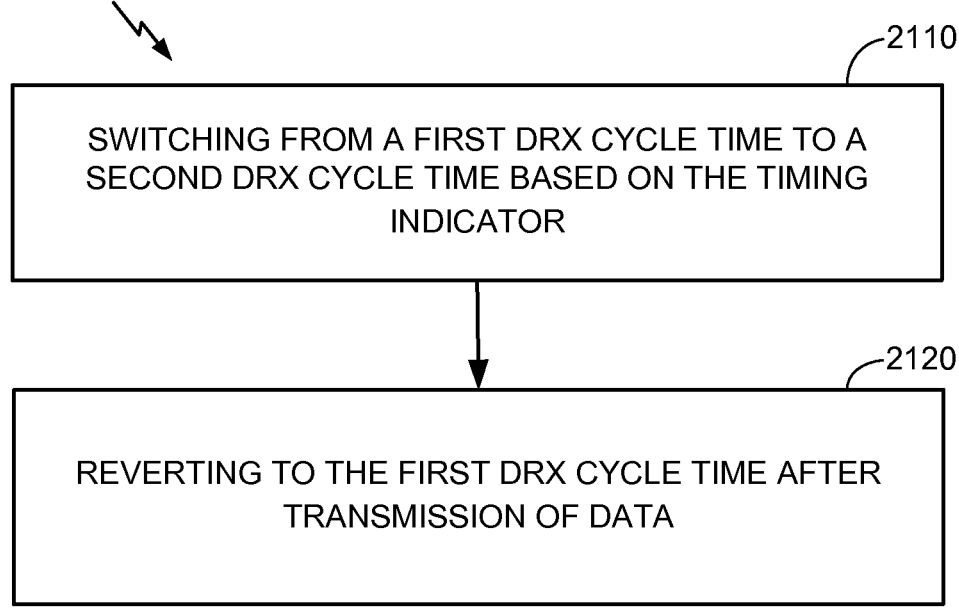

Referring to FIG. 21, the method 1700 may include one or more of the additional operations 2100. For example, the method 1700 may further include, at 2110, switching from a first DRX cycle time to a second DRX cycle time based on the timing indicator. For example, the timing indicator may indicate a different DRX timing than normally used, or than used prior to receiving the timing indicator. The method 1700 may further include, at 2120, reverting to the first DRX cycle time after transmission of data or other predetermined event.

Referring to FIG. 22, the method 1700 may include one or more of the additional operations 2200. For example, the method 1700 may further include, at 2210, waiting from a time a negative acknowledgement (NACK) is received from the mobile entity for the time period before retransmitting the DL data to the mobile entity. In addition, the method 1700 may further include, at 2120, waiting from a time a NACK is provided to the mobile entity for the time period before receiving a retransmission of the UL data from the mobile entity. By thus waiting, the base station may obviate any need for the mobile entity to transmit or receive data except during the DRX on cycle.

In accordance with one or more aspects of the embodiments described herein, there are provided devices and apparatuses for joint HARQ and DRX timing, as described above with reference to FIG. 17. With reference to FIG. 23, there is provided an exemplary apparatus 2300 that may be configured as a network entity, or as a processor or similar device/component for use within. The apparatus 2300 may include functional blocks that can represent functions implemented by a processor, software, or combination thereof (e.g., firmware). For example, apparatus 2300 may include an electrical component, module or means 2312 for providing a timing indicator for a DRX cycle during a DRX mode to a mobile entity. Said means may include a processor performing a more detailed algorithm, for example a DRX timing indication as more particularly described in connection with FIGS. 18-22.

The apparatus 2300 may include an electrical component, module or means 2313 for transmitting at least one of DL data or an UL grant indicator to the mobile entity at a first time. Said means may include a processor performing a more detailed algorithm, for example transmitting DL data or an UL grant during a first DRX on cycle.

The apparatus 2300 may include a component, module or means 2314 for waiting from the first time for a time period indicated by the timing indicator before receiving at least one of an acknowledgement of the DL data or UL data responsive to the UL grant from the mobile entity. Said means may include a processor performing a more detailed algorithm, for example a DRX time coupled to a wait loop servicing the acknowledgement and/or UL grant.

In related aspects, the apparatus 2300 may optionally include a processor component 2350 having at least one processor, in the case of the apparatus 2300 configured as a network entity (e.g., a BS, eNB, etc.), rather than as a processor. The processor 2350, in such case, may be in operative communication with the components 2312-2314 via a bus 2352 or similar communication coupling. The processor 2350 may effect initiation and scheduling of the processes or functions performed by electrical components 2312-2314.

In further related aspects, the apparatus 2300 may include a transceiver component 2354 (radio/wireless or wired). A stand alone receiver and/or stand alone transmitter may be used in lieu of or in conjunction with the transceiver 2354. The apparatus 2300 may optionally include a component for storing information, such as, for example, a memory device/component 2356. The computer readable medium or the memory component 2356 may be operatively coupled to the other components of the apparatus 2300 via the bus 2352 or the like. The memory component 2356 may be adapted to store computer readable instructions and data for effecting the processes and behavior of the components 2312-2314, and subcomponents thereof, or the processor 2350, or the methods disclosed herein. The memory component 2356 may retain instructions for executing functions associated with the components 2312-2314. While shown as being external to the memory 2356, it is to be understood that the components 2312-2314 can exist within the memory 2356. It is further noted that the components in FIG. 23 may comprise processors, electronic devices, hardware devices, electronic subcomponents, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication comprising:
   transmitting an acknowledgement timing capability to a network node;
   receiving a timing indicator for a discontinuous reception (DRX) cycle during a DRX mode;
   adjusting at least an acknowledgement timing in response to receiving the timing indicator for the DRX cycle;
   switching from a first DRX cycle time to a second DRX cycle time based on the timing indicator; and
   reverting to the first DRX cycle time in response to transmission of data,
   wherein the received timing indicator is based on the acknowledgement timing capability transmitted to the network node, and wherein the acknowledgment timing capability indicates a range of DRX timing that can be implemented by a mobile entity.

2. The method of claim 1, further comprising at least one of receiving or transmitting an acknowledgment based on an adjusted acknowledgement timing.

3. The method of claim 1, wherein the acknowledgement timing comprises at least one of a hybrid automatic repeat request (HARQ) timing or a higher layer retransmission acknowledgement timing.

4. The method of claim 1, further comprising monitoring one of a downlink (DL) or uplink (UL) grant for the timing indicator during a DRX ON cycle.

5. The method of claim 1, further comprising receiving the timing indicator in a physical downlink control channel (PDCCH) or evolved PDCCH (ePDCCH).

6. The method of claim 1, wherein the timing indicator is associated with a traffic transmission.

7. The method of claim 1, wherein the timing indicator is based on at least one of a system load, quality of service (QoS) level, or timing delay requirement.

8. The method of claim 1, further comprising receiving a set of timing indicators in at least one of a system information block (SIB) or a radio resource control (RRC) signal, wherein the set of timing indicators comprises the timing indicator.

9. The method of claim 1, further comprising receiving the timing indicator in an RRC signal using a random access channel (RACH) procedure.

10. The method of claim 1, further comprising adjusting at least one of a transmission timing or retransmission timing in response to receiving the timing indicator for the DRX cycle.

11. A wireless communication apparatus comprising:
    at least one processor configured to: transmit an acknowledgement timing capability to a network node, receive a timing indicator for a discontinuous reception (DRX) cycle during a DRX mode, adjust at least an acknowledgement timing in response to receiving the timing indicator for the DRX, switch from a first DRX cycle time to a second DRX cycle time based on the timing indicator, and revert to the first DRX cycle time in response to transmission of data, wherein the received timing indicator is based on the acknowledgement timing capability transmitted to the network node, and wherein the acknowledgment timing capability indicates a range of DRX timing that can be implemented by a mobile entity; and
    a memory coupled to the at least one processor for storing data.

12. The apparatus of claim 11, wherein the processor is further configured to perform at least one of receiving or transmitting an acknowledgment based on an adjusted acknowledgement timing.

13. The apparatus of claim 11, wherein the processor is further configured to adjust the acknowledgement timing comprising at least one of a hybrid automatic repeat request (HARQ) timing or a higher layer retransmission acknowledgement timing.

14. The apparatus of claim 11, wherein the processor is further configured to monitor one of a downlink (DL) or uplink (UL) grant for the timing indicator during a DRX ON cycle.

15. The apparatus of claim 11, wherein the processor is further configured to receive the timing indicator in a physical downlink control channel (PDCCH) or evolved PDCCH (ePDCCH).

16. The apparatus of claim 11, wherein the processor is further configured to receive the timing indicator associated with a traffic transmission.

17. The apparatus of claim 11, wherein the processor is further configured to receive the timing indicator is based on at least one of a system load, quality of service (QoS) level, or timing delay requirement.

18. The apparatus of claim 11, wherein the processor is further configured to receive a set of timing indicators in at least one of a system information block (SIB) or radio resource control (RRC) signal, wherein the set of timing indicators comprises the timing indicator.

19. The apparatus of claim 11, wherein the processor is further configured to receive the timing indicator in an RRC signal using a random access channel (RACH) procedure.

20. The apparatus of claim 11, wherein the processor is further configured to adjust at least one of a transmission timing or retransmission timing in response to receiving the timing indicator for the DRX cycle.

21. A wireless communication apparatus comprising:
    means for transmitting an acknowledgement timing capability to a network node;
    means for receiving a timing indicator for a discontinuous reception (DRX) cycle during a DRX mode;
    means for adjusting at least an acknowledgement timing in response to receiving the timing indicator for the DRX cycle;
    means for switching from a first DRX cycle time to a second DRX cycle time based on the timing indicator; and
    means for reverting to the first DRX cycle time in response to transmission of data,
    wherein the received timing indicator is based on the acknowledgement timing capability transmitted to the network node, and wherein the acknowledgment timing capability indicates a range of DRX timing that can be implemented by a mobile entity.

22. A computer program product, comprising:
    a non-transitory computer-readable medium comprising code for causing at least one computer to:
    transmit an acknowledgement timing capability to a network node;
    receive a timing indicator for a discontinuous reception (DRX) cycle during a DRX mode;
    adjust at least an acknowledgement timing in response to receiving the timing indictor for the DRX cycle;
    switch from a first DRX cycle time to a second DRX cycle time based on the timing indicator; and
    revert to the first DRX cycle time in response to transmission of data,
    wherein the received timing indicator is based on the acknowledgement timing capability transmitted to the network node, and wherein the acknowledgment timing capability indicates a range of DRX timing that can be implemented by a mobile entity.

23. A method for wireless communication comprising:
receiving an acknowledgement timing capability from a mobile entity;
providing a timing indicator for a discontinuous reception (DRX) cycle during a DRX mode to the mobile entity;
transmitting at least one of downlink (DL) data or an uplink (UL) grant indicator to the mobile entity at a first time;
waiting from the first time for a time period indicated by the timing indicator before receiving at least one of an acknowledgement of the DL data or UL data responsive to the UL grant from the mobile entity;
switching from a first DRX cycle time to a second DRX cycle time based on the timing indicator; and
reverting to the first DRX cycle time in response to transmission of data,
determining the timing indicator at least in part based on the acknowledgement timing capability received from the mobile entity,
wherein the acknowledgment timing capability indicates a range of DRX timing that can be implemented by the mobile entity.

24. The method of claim 23, further comprising determining the timing indicator based on a delay sensitivity of the mobile entity.

25. The method of claim 23, further comprising providing the timing indicator configured as at least one of a hybrid automatic repeat request (HARQ) timing indicator or a higher layer retransmission acknowledgement timing indicator.

26. The method of claim 23, further comprising waiting for the time period after receiving the UL data before transmitting an acknowledgment for the UL data to the mobile entity.

27. The method of claim 23, further comprising transmitting the timing indicator in a physical downlink control channel (PDCCH) or evolved PDCCH (ePDCCH).

28. The method of claim 23, further comprising determining the timing indicator based on at least one of a system load, quality of service (QoS) level, or timing delay requirement.

29. The method of claim 23, further comprising transmitting a set of timing indicators in at least one of a system information block (SIB) or radio resource control (RRC) signal, wherein the set of timing indicators comprises the timing indicator.

30. The method of claim 23, further comprising transmitting the timing indicator in an RRC signal using a random access channel (RACH) procedure.

31. The method of claim 23, further comprising waiting from a time a negative acknowledgement (NACK) is received from the mobile entity for the time period before retransmitting the DL data to the mobile entity.

32. The method of claim 23, further comprising waiting from a time a negative acknowledgement (NACK) is provided to the mobile entity for the time period before receiving a retransmission of the UL data from the mobile entity.

33. A wireless communication apparatus comprising:
at least one processor configured to: receive an acknowledgement timing capability from a mobile entity, provide a timing indicator for a discontinuous reception (DRX) cycle during a DRX mode to the mobile entity, transmit at least one of downlink (DL) data or an uplink (UL) grant indicator to the mobile entity at a first time, wait from the first time for a time period indicated by the timing indicator before receiving at least one of an acknowledgement of the DL data or UL data responsive to the UL grant from the mobile entity, switch from a first DRX cycle time to a second DRX cycle time based on the timing indicator, revert to the first DRX cycle time in response to transmission of data, and determine the timing indicator at least in part based on the acknowledgement timing capability received from the mobile entity, wherein the acknowledgment timing capability indicates a range of DRX timing that can be implemented by the mobile entity; and
a memory coupled to the at least one processor for storing data.

34. The apparatus of claim 33, wherein the at least one processor is further configured to determine the timing indicator based on a delay sensitivity of the mobile entity.

35. The apparatus of claim 33, wherein the at least one processor is further configured to provide the timing indicator configured as at least one of a hybrid automatic repeat request (HARQ) timing indicator or a higher layer retransmission acknowledgement timing indicator.

36. The apparatus of claim 33, wherein the at least one processor is further configured to wait for the time period after receiving the UL data before transmitting an acknowledgment for the UL data to the mobile entity.

37. The apparatus of claim 33, wherein the at least one processor is further configured to transmit the timing indicator in a physical downlink control channel (PDCCH) or evolved PDCCH (ePDCCH).

38. The apparatus of claim 33, wherein the at least one processor is further configured to determine the timing indicator based on at least one of a system load, quality of service (QoS) level, or timing delay requirement.

39. The apparatus of claim 33, wherein the at least one processor is further configured to transmit one or more timing indicators in at least one of a system information block (SIB) or radio resource control (RRC) signal in a random access channel (RACH) procedure, wherein the one or more timing indicators comprises the timing indicator.

40. The apparatus of claim 33, wherein the at least one processor is further configured to perform at least one of: waiting from a time a negative acknowledgement (NACK) is received from the mobile entity for the time period before retransmitting the DL data to the mobile entity, or waiting from a time a negative acknowledgement (NACK) is provided to the mobile entity for the time period before receiving a retransmission of the UL data from the mobile entity.

41. A wireless communication apparatus comprising:
means for receiving an acknowledgement timing capability from a mobile entity;
means for providing a timing indicator for a discontinuous reception (DRX) cycle during a DRX mode to the mobile entity;
means for transmitting at least one of downlink (DL) data or an uplink (UL) grant indicator to the mobile entity at a first time;
means for waiting from the first time for a time period indicated by the timing indicator before receiving at least one of an acknowledgement of the DL data or UL data responsive to the UL grant from the mobile entity;
means for switching from a first DRX cycle time to a second DRX cycle time based on the timing indicator;
means for reverting to the first DRX cycle time in response to transmission of data; and
means for determining the timing indicator at least in part based on the acknowledgement timing capability,
wherein the acknowledgment timing capability indicates a range of DRX timing that can be implemented by the mobile entity.

42. A computer program product, comprising:

a non-transitory computer-readable medium comprising code for causing at least one computer to: receive an acknowledgement timing capability from a mobile entity, provide a timing indicator for a discontinuous reception (DRX) cycle during a DRX mode to the mobile entity, transmit at least one of downlink (DL) data or an uplink (UL) grant indicator to the mobile entity at a first time, wait from the first time for a time period indicated by the timing indicator before receiving at least one of an acknowledgement of the DL data or UL data responsive to the UL grant from the mobile entity, switch from a first DRX cycle time to a second DRX cycle time based on the timing indicator, and revert to the first DRX cycle time in response to transmission of data, and determine the timing indicator at least in part based on the acknowledgement timing capability received from the mobile entity, wherein the acknowledgment timing capability indicates a range of DRX timing that can be implemented by the mobile entity.

* * * * *